Jan. 1, 1946.   L. B. PORTMAN ET AL   2,391,999
OPTICAL COMPARATOR
Filed Sept. 21, 1942.   3 Sheets-Sheet 1
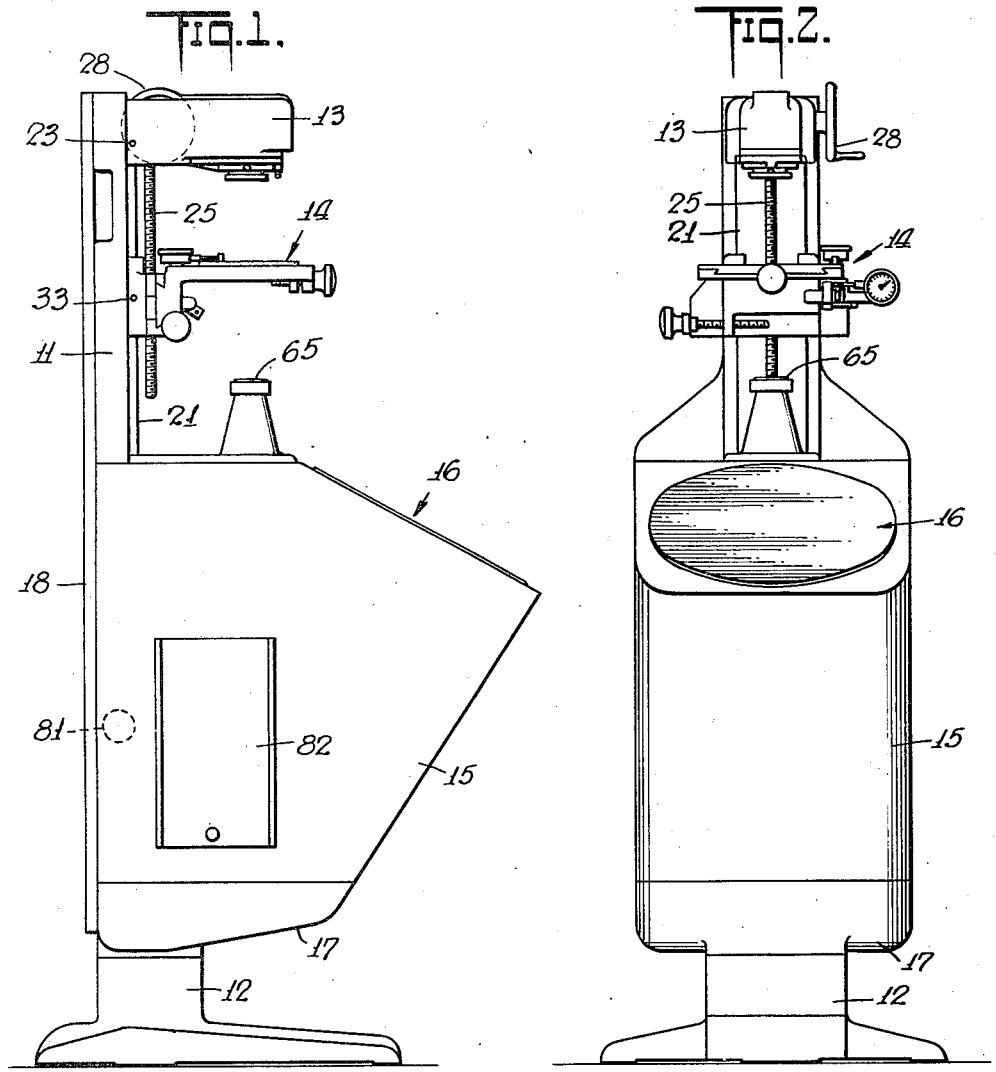
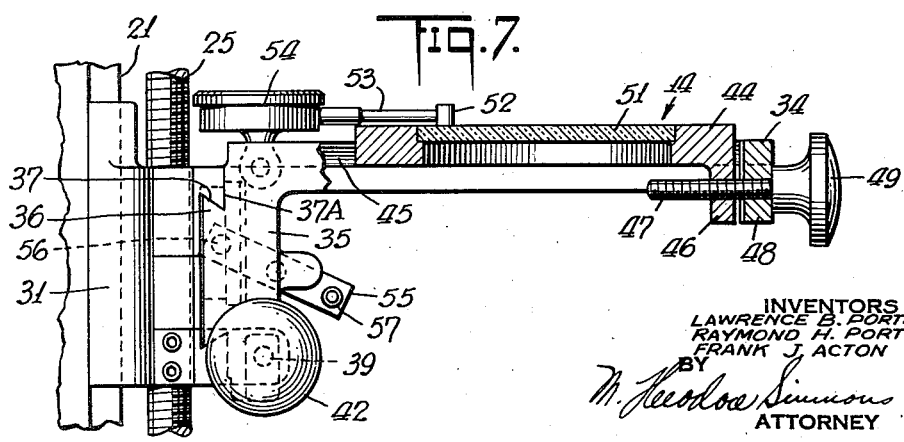
INVENTORS
LAWRENCE B. PORTMAN
RAYMOND H. PORTMAN
FRANK J. ACTON
BY
ATTORNEY

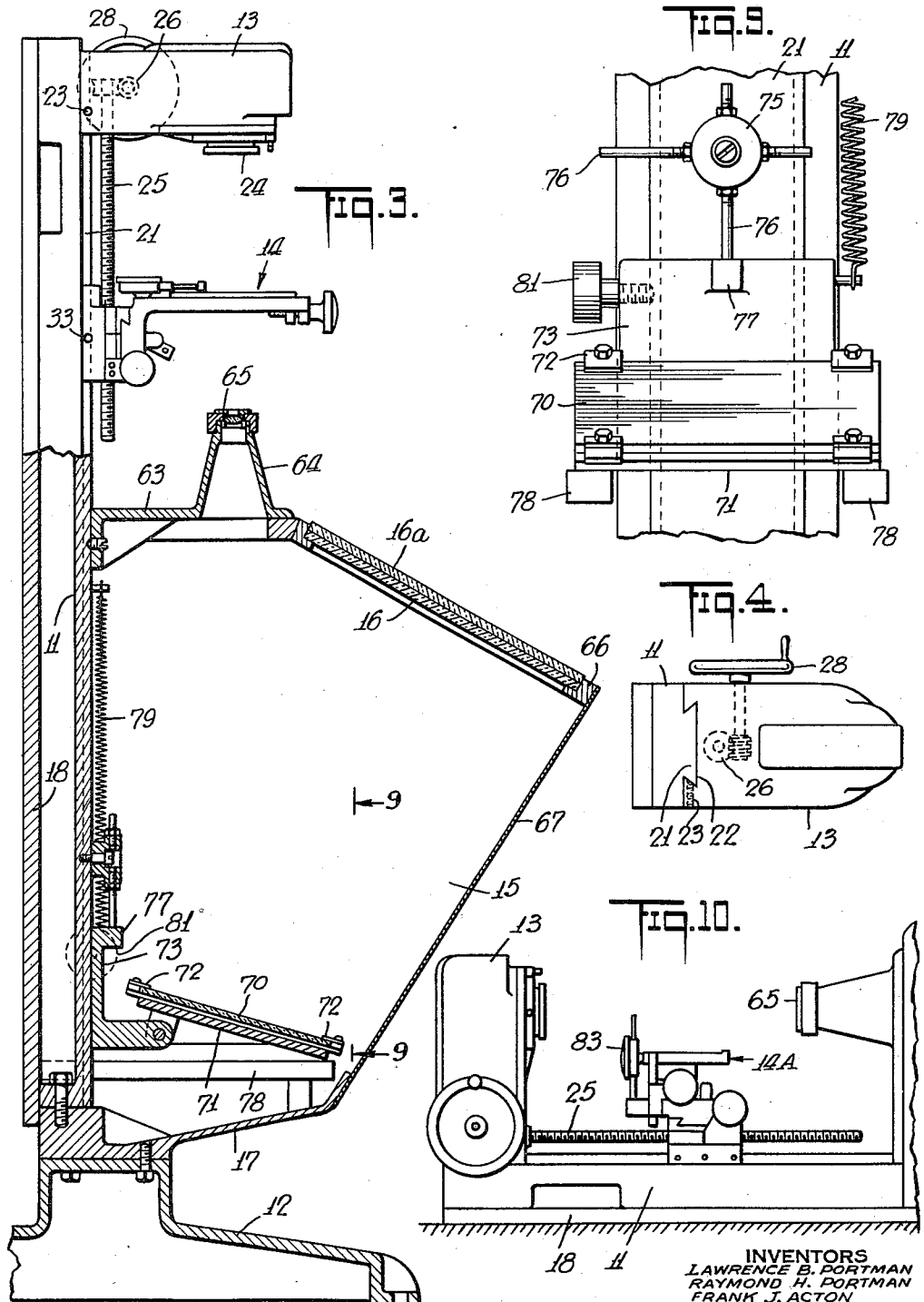

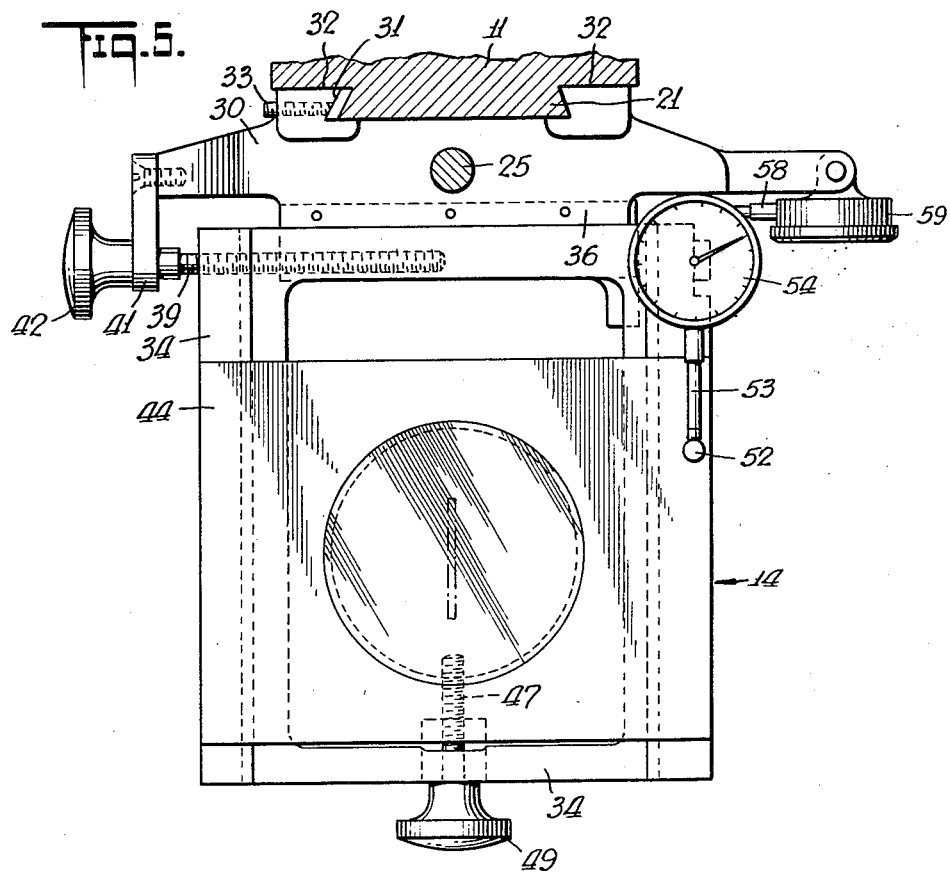
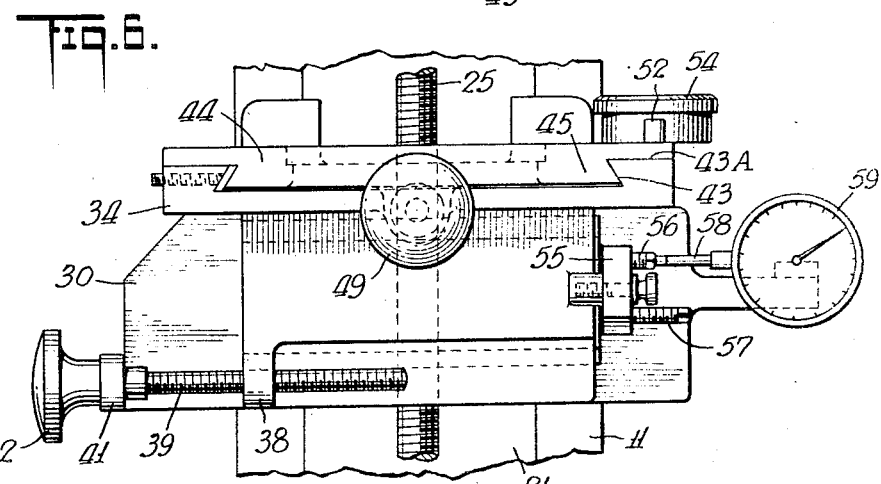
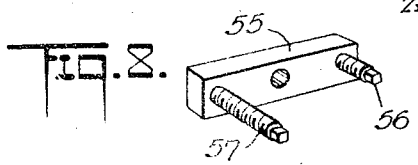

Patented Jan. 1, 1946

2,391,999

UNITED STATES PATENT OFFICE 2,391,999

OPTICAL COMPARATOR

Lawrence B. Portman, Raymond H. Portman, and Frank J. Acton, Mount Vernon, N. Y.

Application September 21, 1942, Serial No. 459,207

10 Claims. (Cl. 88—24)

Optical comparators, to which this invention relates, enable a minute examination and accurate measurements to be made of an object, such as a manufactured part, by means of projecting an enlarged image of the part upon a screen.

The several features of this invention are applicable to the various types of such devices, but will be described, by way of example, in conjunction with the type for projecting a magnified silhouette or outline of the object onto the screen.

It is one object of this invention to provide a portable construction whereby the optical comparator may be used either as a pedestal mounted device or a bench mounted device, and may be quickly changed from one to the other, while preserving all of its features of adjustability and a conveniently located screen.

It is another object of this invention to provide a construction of device which is very rugged so as not to be subjected to inaccuracies and other difficulties due to vibrations and the like, such as are encountered in manufacturing plants where these devices are frequently used.

It is still another object of this invention to provide a simple and compact structure occupying little floor space.

It is still another object of this invention to provide simply operated adjustments for all the various parts of the comparator so that highly skilled persons will not be required to operate the device to attain its full measure of accuracy, sharpness of detail, freedom from distortion, etc.

It is a further object of this invention to provide an improved construction of work stage which will not be subject to vibrations, which will have very wide ranges of movement to enable one device to be used with a large variety of sizes and styles of objects, and in which measurements may be directly read upon dial type indicators associated with the stage.

It is a still further object of this invention to provide improved means for adjusting the reflecting mirror of the optical system to accord with various magnifications of the lens system.

Other and further objects of this invention will be evident from this specification taken in conjunction with the accompanying drawings, in which—

Figure 1 is a side elevation and Fig. 2 is a front elevation of an optical comparator constructed according to this invention.

Fig. 3 is a side elevation of the device in enlarged detail and with certain parts shown in section.

Fig. 4 is a fragmentary plan view of the lamp housing and its mounting.

Fig. 5 is a plan view and Fig. 6 is a front view of the coordinate stage of this device showing the improved construction.

Fig. 7 is a side elevation of the coordinate stage of Fig. 5, parts being shown in section.

Fig. 8 is an enlarged perspective of the turret used with the coordinate stage of Figs. 5-7.

Fig. 9 is a front view of the adjustable mirror of the optical system, also showing the turret used in connection therewith.

Fig. 10 is a side elevation of the optical comparator used as a table mounted device.

Referring to Figs. 1, 2 and 3, the device comprises generally a chassis or upright 11, a pedestal 12 upon which the upright is mounted, a lamp housing 13, a work stage 14, and a cabinet 15 which houses part of the optical system and supports the screen 16 where it is directly visible together with the work piece on the stage 14.

The upright 11 is a hollow frame secured at its lower end to a post on a casting 17, comprising the base of the cabinet 15. The pedestal 12 is likewise a hollow casting which is bolted to the base casting 17, as seen in Fig. 3, so that the same may be removed readily whenever it is desired to support the comparator on a work bench. For this latter purpose the back of the frame is closed by the board 18 upon which the comparator rests, as seen in Fig. 10.

As seen by Figs. 3 and 4, the chassis or upright 11 has on the front thereof a wide strip 21 which is beveled at each side to form a dovetail that extends the full length of the upright and along which the several units are adjustable. The lamp housing 13 has a mortise 22 formed along its rear surface which fits upon the dovetail strip 21 and guides the same in its vertical movement, as will be described. A set screw 23 in the side of the lamp housing engages the dovetail strip to hold the lamp housing in its adjusted position. Inside the housing is any suitable lamp, such as a filament type projection bulb, the light beams being projected downwardly through a condensing lens 24. This lens is adjustable in the housing so as to provide parallel light beams toward the stage 14. A vertical adjusting screw 25 parallel to the upright 11, has the lamp housing 13 mounted thereon and is driven from a worm wheel and worm 26 by means of the hand wheel 28 mounted at the side of that housing.

The coordinate stage 14 has a rectangular support 30 along the rear face of which is a mortise 31 fitting upon the dovetail strip 21. A wide shoulder 32 at each side of the mortise engages the upright 11 and together with the long dovetail joint provides a firm vertical support for the stage. The adjusting screw 25 also is received in the support 30 for the stage 14 and is the means by which the stage is moved vertically in bringing the object into sharp focus. A set screw 33 engages the strip 21 and holds the stage in its adjusted positions.

The stage comprises a base frame 34 having a depending rear flange 35 (Fig. 7) on the rear of which is a dovetail strip 36 which extends across the full width of the frame and meshes with a mortise 37 cut in the outer face of the support 30. The flange 35 has an ear 38 (Fig. 6) thereon in which an adjusting screw 39 is received, the screw being journaled in a bracket 41 carried by the support 30 and has a knob 42 on the outer end thereof. The screw is finely threaded and calibrated so that by turning the knob 42 the stage may be moved from side to side in exceedingly small increments. Here again there is a wide shoulder 37A on either side of the mortise 37 which contacts the flange 35 so that a very firm support is achieved.

The top of the frame 34 has a mortise 43 along each side thereof beyond which the frame has a wide surface 43A. A top frame 44 has a dovetail portion 45 on the underside thereof which engages with the mortises 43, the projecting sides of the frame engaging the surfaces 43A of the base frame 34. The top frame 44 has a depending flange 46 (Fig. 7) along the front edge thereof in which is received an adjusting screw 47 that is journaled in a depending flange 48 along the front edge of the lower frame 34. By means of a knob 49 the adjusting screw 47 is turned to move the top frame forwardly and backwardly, the screw being finely calibrated as described for screw 39. A glass window 51 is received in a recess in the center of the top frame 44 so as to be flush with the top of the frame. The window is over the unobstructed center portions of the frames of the stage, and the work being measured is placed upon or over the region of the glass.

The top frame 44 has an upstanding peg 52 thereon which is arranged to engage with the plunger 53 of a dial type indicator 54 that is mounted on the base frame 34 and by means of which the forward and backward movements of the frame of the stage may be readily measured and recorded. The rear flange 35 of the base frame 34 has a turret block 55 (Figs. 6, 7 and 8) pivotally mounted on the side thereof in which are secured pins 56 and 57 that are adapted respectively to act as followers brought into position to engage the plunger 58 of a second dial type indicator 59 by means of which the lateral or side to side movements of the stage may be measured and recorded. It will be noted that the pins 56 and 57 are of different lengths whereby the same indicator may be used notwithstanding the very wide range of movement (approximately three inches) of the stage which may be made with the above described construction. The dial 59 is mounted on the bracket 61 which projects from the side of the support 30. By locating the adjusting screws below the top of the stage with the described structure large lateral and transverse adjustments may be made to allow for use of this apparatus with a wide variety of parts.

Instead of mounting the part upon the glass 51, the part may be held by a suitable chuck, one form of which is illustrated at 62 in Fig. 11, and which may be suitably mounted on the stage support and arranged to hold the work in front of the window space 51. Other forms of chucks and holding means may be used depending upon the nature of the object and the kind of measurements, etc., wanted.

The cabinet 15 has a top plate 63 secured to the frame 11 in which is a conical lens housing 64 removably holding a focusing lens 65. Different focusing lens 65 are used depending upon the desired magnification. A recessed frame 66 is secured to the front of the top plate 63 and projects downwardly therefrom at a convenient angle. The frame holds the glass screen 16 on which the magnified image of the object is received. This is preferably a frosted glass and may have a clear glass cover 16A cooperating therewith when it is desired to hold an enlarged tracing of the object for comparison with the magnified image of the object. The cabinet is closed by side and front walls 67.

A reflecting mirror 70 (Figs. 3 and 9) is located near the bottom of the cabinet 15, the mirror being mounted upon a plate 71 by means of clamps 72. The plate 71 is pivoted upon a bracket 73 that has a mortise in the rear face thereof which fits upon the dovetail strip 21 of the upright 11. The mirror is of the single surface type and is adjusted to reflect the image from the lens 65 onto the screen 16. Inasmuch as the focal length is different for the several magnifications the angular position of the mirror must change to reflect the image upon the screen free from distortion. To insure this proper positioning of the mirror, a turret 75 is pivotally mounted on the dovetail strip 21 above the bracket 73. Four or more pins 76, each of a different length, is mounted in the turret and each may be brought into position to be engaged by a lug 77 on top of the bracket 73. Each position of the bracket against one of the stop pins 76 insures the proper position of the mirror for that particular magnification. It will be understood that the edge of the supporting plate 71 of the mirror rests upon the rail 78 supported in the bottom of the cabinet 15. A spring 79 aids in holding the bracket against the pins of the turret 75, and a set screw 81 engages the dovetail strip 21 to hold the mirror bracket 73 in its adjusted positions. The adjustment for the mirror is accessible through the door 82 (Fig. 1) in the side walls 67 of the cabinet.

One operation of the described optical comparator, a proper lens 65 for the desired magnification is inserted in the holder 64, and the mirror bracket is raised or lowered as just described to fix the position of the mirror to accord with the selected magnification. The piece of work to be examined is placed upon the window 51 of the stage 14, and the lamp in housing 13 is energized. The light rays from the condensing lens 24 is focused upon the work piece and through the window 51, onto the focusing lens 65. The silhouette of the work piece is reflected by the mirror 70 onto the screen 16.

In order to further sharpen the focusing of the image, the stage may be vertically adjusted for which purpose the set screw 23 of the lamp housing is tightened and the set screw 33 of the stage is loosened. Then by turning the hand wheel 28 the rotation of the adjusting screw 25 raises and lowers the stage. The focusing also may be sharpened by moving the lamp housing, with the condensing lens, relatively to the table, which is done by tightening the set screw 33 of the stage and loosening of the set screw 23 of the lamp housing. Thereupon rotation of the hand wheel 28 will cause the lamp housing to travel along the chassis or upright 11 as the screw travels in the support 30 of the stage.

With the proper focusing of the light beams completed, the magnified image of the object may be compared with a suitable tracing held upon the screen 16, or measurements may be made of the image upon the screen. Or, the lateral and forward adjusting screws 42 and 49, respectively, of the stage may be operated, the measurements denoted by these movements of the stage being read upon the associated dial indicators. Or these same adjusting screws may be operated in conjunction with making measurements on the screen 16.

Referring to the form shown in Fig. 10, when this device is used as a bench type model, a different type of stage 14A provided with a work holding chuck 83 is used in place of the stage 14 described in detail in connection with Figs. 5, 6 and 7. Otherwise, the stage and the remainder of the apparatus are the same with the same adjustments, and similar parts carry similar reference numerals as used in connection with the apparatus shown in Figs. 1 and 2.

Modifications may be made in the arrangement and location of parts within the spirit and scope of our invention, and such modifications are intended to be covered by the appended claims.

We claim:

1. In an optical comparator, a main support, a dovetail strip extending a substantial distance therealong, a lamp, a lamp housing having a mortise fitting on said strip, a changeable lens system aligned therewith, a work stage cooperating therewith and having a work holder and a support therefor in which is a mortise also fitting upon said strip, locking means cooperating respectively with said lamp housing and said stage support, and screw means interconnecting the stage and lamp housing by means of which they are adjustable along said strip relatively to each other and in alignment with said lens system in accordance with the work requirements.

2. In an optical comparator, a main support, a dovetail strip thereon, an optical system mounted on said support and arranged to reproduce images of work pieces, a work piece supporting stage mounted to one side of said support and adjustable along said strip and comprising a support having a mortise fitting upon said dovetail, a second mortise on said stage support and arranged crosswise to the first mentioned mortise, a frame having a rear portion provided with a dovetail fitting in said second mortise, an adjusting screw arranged to move the frame laterally in said second mortise, a mortise in said frame extending perpendicularly of said first mentioned mortise, a second frame having a dovetail fitting in said frame mortise, an adjusting screw arranged to move the second frame in said frame mortise, and a work piece holder supported in said frames and arranged to hold a work piece in the path of said optical system.

3. In an optical comparator, a main support, a dovetail strip thereon, an optical system mounted on said support and arranged to reproduce images of work pieces, a coordinate work piece supporting stage adjustable along said strip and comprising a support having a mortise fitting upon said dovetail, a second mortise on said stage support arranged crosswise to the first mentioned mortise, a frame having a depending flange provided with a dovetail fitting in said second mortise, an adjusting screw arranged to move the frame laterally in said second mortise, a mortise on said frame, a second frame having a dovetail fitting in the last mentioned mortise, the frames having cooperating depending flanges, an adjusting screw mounted in the flanges and arranged to move the second frame with respect to the first frame, and a work piece holder supported in said frames and arranged to hold a work piece in the path of said optical system.

4. In an optical comparator, a main support, a dovetail strip thereon, an optical system mounted on said support and arranged to reproduce images of work pieces, a coordinate work piece supporting stage adjustable along said strip and comprising a support having a mortise fitting upon said dovetail, a second mortise on said stage support arranged crosswise to the first mentioned mortise, a frame having a depending flange provided with a dovetail fitting in said second mortise, an adjusting screw mounted on said support and received in said flange so as to move the frame laterally with respect to its support, a mortise at each side of said frame extending perpendicularly to said main support, a second frame having a dovetail at each side fitting in the last mentioned mortises, the frames having forward depending flanges, an adjusting screw mounted and received in the respective forward flanges and arranged to move the second frame forwardly and backwardly with respect to said main support, and a work piece holder supported in said frames and arranged to hold a work piece in the path of said optical system.

5. In an optical comparator, a main support, a dovetail strip thereon, an optical system mounted on said support and arranged to reproduce images of work pieces, a work piece supporting stage adjusting on said strip and comprising a support having a mortise fitting upon said strip and a wide supporting shoulder at each side of the mortise engaging said main support, a second mortise on the stage support arranged crosswise to the first mentioned mortise, a frame having a rear portion provided with a dovetail fitting in said second mortise and wide supporting shoulders on either side of said dovetail and engaging the stage support, an adjusting screw arranged to move the frame laterally with respect to its support, a mortise in said frame extending perpendicularly to the main support, a second frame having a dovetail fitting in the last mentioned mortise and wide supporting shoulders at each side thereof engaging the first mentioned frame, an adjusting screw arranged to move the second frame forwardly and backwardly on the first frame, and a work piece holder supported in said frames and arranged to hold a work piece in the path of said optical system.

6. In an optical comparator, a main support, an optical system mounted on said support and arranged to reproduce images of work pieces, a work stage interposed in said lens system and arranged to hold a work piece, said stage comprising a member adjustable lengthwise of said support, a frame carried by said member, means for adjusting the frame laterally of said member, a dial type indicator mounted alongside the frame and having a plunger, a rotatable member carried by said frame and having a plurality of followers of different lengths which are arranged to be selectively brought into position between the frame and plunger and for engagement by the plunger so that the lateral movements of the frame may be determined on said indicator as a measurement on a work piece carried thereby.

7. In an optical contour comparator, a main support, a lamp, a lamp housing, a work piece supporting stage, a lens system aligned with a lamp in said housing and with said stage and arranged to provide different selected magnifications of a work piece on said table, a cabinet to one side of said work stage, a screen fixedly mounted on the cabinet, a mirror mounted in said cabinet and arranged to reflect images from said lens system onto said screen, the mounting comprising a slidable carrier for the mirror and means for adjusting and tilting the position of the mirror for the several different magnifications said means comprising a spring cooperating with said carrier and movable means having a plurality of stops on different lengths respectively movable into position to cooperate with said carrier and spring to position the mirror both vertically and angularly for the respective magnifications.

8. In an optical comparator, an upright, a lamp, a lamp housing therefor and mounted on said upright, a condenser lens carried by said housing, a work supporting stage also mounted on said upright in line with said lens, means for adjusting the stage parallel to said upright, the stage comprising separable members, means for moving said members as a unit transversely of said upright and for moving said members relatively to each other perpendicularly of said upright, a frame on said upright, an objective lens carried by said frame on the opposite side of said stage and in line with said condenser lens, an inclined screen also carried by the frame so as to be located at the front of said upright, a mirror, and a support for the mirror also mounted on the upright below the screen, the mirror being arranged to reflect onto the screen an image of the work on said stage.

9. In an optical contour comparator, a main support, a dovetail strip extending longitudinally thereof, a lamp, a lamp housing having a mortise fitting on said strip, a work stage mounted to one side of said housing and comprising a work holder and a support in which is a mortise also fitting upon said strip, means for adjusting said lamp housing and said stage lengthwise of said strip, a changeable lens system mounted in cooperative relation with said stage and said lamp, a mirror aligned with said lens system and having a movable support in which is a mortise also fitting upon said strip, means for adjusting the mirror support lengthwise of said strip to cooperate with said lens system, and a screen mounted in fixed position on said support to receive images reflected from said mirror in the various adjusted positions thereof.

10. In an optical comparator, a main support having a substantially flat back arranged so that the comparator may rest thereon in a horizontal position, a pedestal, means for detachably mounting one end of said support on the pedestal so that the comparator also may stand on said pedestal in upright position, a lamp, a lamp housing mounted on the front of said main support, a work stage, means for adjustably mounting the stage on the front of said support, and a cabinet mounted on the front of said support and having a lens holder thereon aligned with said stage and lamp, a screen on said cabinet inclined and arranged so as to be readily viewable by a workman whether the comparator is resting on the back of the support or on the pedestal, and a mirror mounted in the cabinet so as to be optically aligned with the lens holder and the screen to reflect thereon magnified images of work on said stage.

LAWRENCE B. PORTMAN.
RAYMOND H. PORTMAN.
FRANK J. ACTON.